J. HIBBARD.
Cheese Press.
No. 20,346.
Patented May 25, 1858.
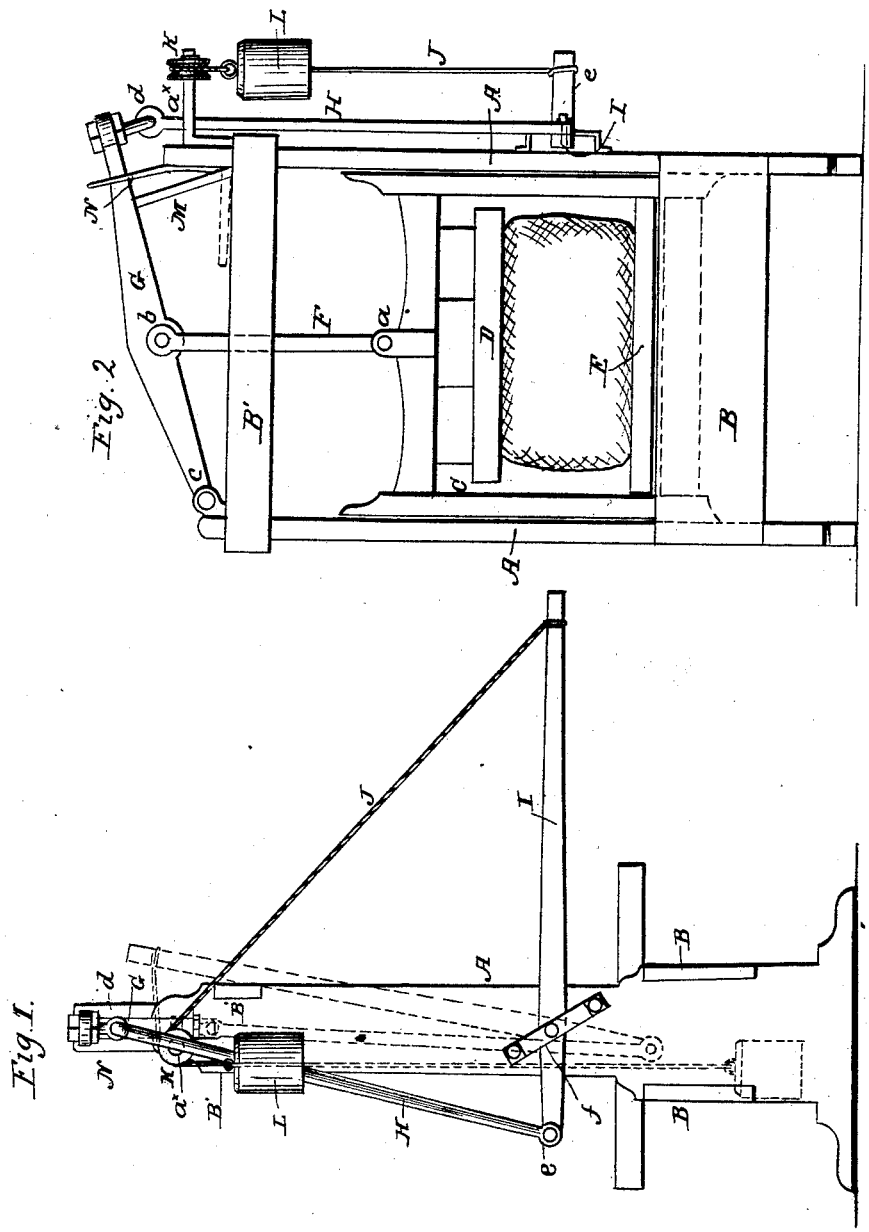

UNITED STATES PATENT OFFICE.

J. HIBBARD, OF WEATHERSFIELD, NEW YORK.

CHEESE-PRESS.

Specification of Letters Patent No. 20,346, dated May 25, 1858.

*To all whom it may concern:*

Be it known that I, JACOB HIBBARD, of Weathersfield, in the county of Wyoming and State of New York, have invented a new and useful Improvement in Cheese-Presses; and I do hereby declare that the following is a full, clear, and exact description of the same, reference being had to the annexed drawings, making a part of this specification, in which—

Figure 1, is a side view of a cheese press constructed according to my invention. Fig. 2, is a front view of the same.

Similar letters of reference indicate corresponding parts in the two figures.

This invention consists in operating the follower of the press by a system of levers and a weight arranged as hereinafter shown whereby a progressive power is obtained, and the cheese or curd so acted upon or subjected to such a pressure that all the whey and useless substances will be expelled or expressed from it and all the cream or oily and essential substances retained.

To enable those skilled in the art to fully understand and construct my invention I will proceed to describe it.

A, A, represent two uprights which are connected by cross-ties B, B, at their lower part and by cross-ties B', B', at their upper parts.

C, represents a sliding frame or gate which is fitted between the uprights A, A, a follower D, being fitted within it.

On the lower cross-ties B, B, a horizontal bed E, is placed. This bed has an annular groove made in it as usual to conduct off the whey, and other fluids expressed from the curd or cheese.

To the center of the frame C, at its upper part the lower end of a connecting rod F, is attached by a pivot or bolt $a$, and the upper end of this rod is attached by a pivot or bolt ($b$), to a lever G, one end of which is connected by a joint $c$, to the upper end of one of the uprights A, see Fig. 2. The opposite end of lever G, is connected by a hook and eye $d$, to a rod H, the lower end of which is attached by a pivot $e$, to the inner end of a lever I, which is attached to the outer side of one of the uprights A, by a fulcrum pin $f$. The outer end of the lever I, has a rope J, attached. This rope passes over a pulley K, which is fitted on a horizontal arm $a^x$, at the upper end of the upright to which the lever I, is attached. A weight L, is attached to the rope J.

M, is a slotted curved plate which is attached to the upper end of the upright A, to which the lever I, is attached. The lever G, works in the plate M, which plate serves as a guide to said lever.

N, is a support or prop which is attached to the upper cross-ties B', B', and so arranged that it may be raised and lowered, said prop, when raised supporting the lever G, and frame C, when the same is not in operation, as shown in black Fig. 2.

The operation is as follows:—The lever I, is pulled down in a horizontal position and the frame C, and lever G, will be elevated thereby. The prop or support N, is then raised to support lever G, and frame C, while the cheese O, is being adjusted on the bed E, in the usual way. When the cheese O, is properly adjusted on the bed E, the prop or support N, is lowered, and the weight L, actuates the levers I, G, and rods H, F, and the frame C and follower D, will be depressed, the latter acting on the cheese with a progressive power, said power increasing as the weight L, descends in consequence of the increased leverage obtained by the varying positions of the levers and rods.

The weight L, should not be too heavy as the pressing operation should be performed quite slowly. The difficulty attending the ordinary cheese presses, is, that the cheese is subjected to a sudden quick pressure and a great deal of the cream and oily substance is expressed from it with the whey, and the cheese also in consequence of this quick or abrupt pressure has a rind formed on it, before the whey is fully expelled from it and a portion of the whey therefore is retained within the cheese, which is in consequence rendered worthless. By my improvement this difficulty is obviated and the press is rendered self acting so far as the pressing power is concerned. This press has been practically tested and it works admirably well,—with a weight L, of 20 lbs., the cheese is subjected to a pressure increasing from 250 to 4800 lbs. The vibration or movement of the follower D, need not under ordinary circumstances exceed 4 inches.

I am aware that progressive power presses have been previously used for compressing hay, cotton, and other substances, and I do not claim therefore broadly such operation; but,

Having thus described my invention, what I claim as new and desire to secure by Letters Patent, is—

The combination, as herein described and shown, of the levers I, G, connecting rods F, H, weight L, and follower D, for the purpose set forth.

JACOB HIBBARD.

Witnesses:
A. WILLIAM BODDY,
F. B. NEELY.